United States Patent
Laing et al.

[11] 3,764,186
[45] Oct. 9, 1973

[54] HYDRODYNAMIC BEARING

[76] Inventors: Nikolaus Laing; Ingeborg Laing, both of Hofener Weg 35-37, 7141 Aldingen bei Stuttgart, Germany; Ludwig Ludin, Kesselackerweg, CH 5611 Anglikon-Wohlen, Switzerland

[22] Filed: Mar. 13, 1972

[21] Appl. No.: 233,911

[30] Foreign Application Priority Data

June 18, 1971 Switzerland.................. 8968/71

[52] U.S. Cl. ................................................. 308/9
[51] Int. Cl. ............................................ F16c 17/16
[58] Field of Search............................ 308/9, 122 A

[56] References Cited
UNITED STATES PATENTS
3,663,074  5/1972  Fernlund................................ 308/9

Primary Examiner—Charles J. Myhre
Assistant Examiner—Frank Susko
Attorney—Pennie, Edmonds, Morton, Taylor & Adams

[57] ABSTRACT

A hydrodynamic groove bearing with two bearing parts which have surfaces of revolution facing each other, one of which has spiral grooves, which are subdivided in at least two groups, the grooves of one group start and end in a certain segment of the grooved surface and are connected in series hydrodynamically by means of communicating channels.

20 Claims, 10 Drawing Figures

HYDRODYNAMIC BEARING

THE PRIOR ART

Michell bearings have been replaced by spiral groove bearings, which, referred to the same lubricant, have a much larger carrying capacity than Michell bearings. Spiral groove bearings have a plurality of spiral grooves of very small depth spread over the circumference which extend to the vicinity of the bearing centre. Each spiral groove passes through a large azimuth range, for example, an azimuth angle of 360°, or more. The achievable pressure p is expressed for all spiral groove bearings by the formula:

$$p \approx \mu/h^2$$

where $\mu$ is the viscosity of the lubricant and h is the distance between the bearing surfaces which slide upon each other.

The higher a spiral groove bearing is loaded the closer the two relatively moving bearing sliding surfaces approach each other. Therefore, according to the above equation, the hydrodynamic pressure, built up to compensate for the bearing load, rises.

Spiral groove bearings, particularly when they are closed at the centre, have a very high carrying capacity. The load capacity is highest in spherical bearings with a hemispherical bearing cup closed at the centre. Since, with a narrowing bearing clearance, i.e., with increasing axial force, the lubricant pressures in the bearing clearance greatly increase, these bearings automatically adapt to the axial force, because, over the entire length of a spiral groove, the distance between the two centralised bearing parts rotating relative to each other diminishes.

In spite of the large load capacity of spiral groove bearings, they are rarely used. Although the spiral groove bearing components sliding upon each other are easily manufactured, the practical application of these bearings demands many expensive measures and additional machine elements. Thus, spiral groove axial bearings must be held in their initial position by a special ball bearing. The initial position is determined by the smallest permissible distance between the two sliding surfaces which must be maintained to prevent solid friction due to physical contact of the surfaces. With small bearing clearances of the order of a few microns it is necessary, in addition, that, apart from the axial distance of the two surfaces, the parallelity of the geometric axes of the two solids of rotation sliding upon each other be ensured. The axes can be allowed to be inclined to each other by a very small amount only, since otherwise the two bearing parts will touch each other in a peripheral region.

It is known, furthermore, that, with increasing viscosity, the friction losses, at a given axial load, increase. This not only leads to a mechanical power loss within the bearing but, in larger bearings, furthermore demands cooling devices, e.g., water pipes to convey cooling water.

By contrast with the automatic adaptation to the axial load, the bearing clearance with bearing parts which are not parallel to each other diminishes over a small azimuth range only, about one-fifth of the total circumference so that, in this range, a higher lubricant pressure might be built up had it not been for the fact that the azimuth range of a spiral groove lying in the direction of the radial force communicates at both ends with regions of larger bearing clearance. For this reason, in known spiral groove bearings a pressure builds up in the bearing clearance only when the sliding surfaces moving relative to each other are equally spaced from each other throughout. If this is not true, the carrying film formed by the lubricant through the hydrodynamic forces collapses. This collapse would lead to contact between the two sliding surfaces if it were not for the additional devices described above for preventing such contact.

THE OBJECT OF THE INVENTION

The object of the present invention is to provide a grooved bearing with hydrodynamic pressure generation inside the bearing clearance, the carrying capacity of which adapts itself not only to an axial load but also to a radial load. In other words, the aim of the invention is a grooved bearing in which the sliding surfaces, which carry the load and constitute the boundary of the bearing clearance, automatically centralise each other. This centralising is to be performed by the hydrodynamic forces which produce the carrying film in the bearing clearance.

SUMMARY OF THE INVENTION

The present invention accomplishes this task by dividing the grooved sliding surface into at least two segments and by connecting, with the help of communicating channels, at least some of the grooves which start and finish in a certain segment hydrodynamically in series in such a way that the pressure rises in the individual grooves add up in the direction towards the bearing axis. By contrast with known grooved bearings, the grooves in a bearing according to the invention extend over less than half the circumference and are hydrodynamically connected in series with the grooves in the same segment by means of communicating channels so that the pressure which prevails at the end of the extreme groove is fed backwards to the beginning of the subsequent groove and so on. The best results in terms of the self-centring of grooved bearings according to the invention can be achieved when the grooved sliding surface is subdivided into three or four segments. Since the hydrodynamic pressure built up in the carrying film is in the first approximation, proportional to the effective length of the groove, the carrying capacity of a segment in a bearing according to the invention can be increased by increasing the number of the grooves which may, for example, run concentrically to the bearing axis. By subdividing into segments, the pressure peaks, segment by segment, are uniformly distributed over the circumference of the bearing clearance. In the event of a tipping displacement of one bearing part relative to the other, the pressure rises in the segment where the bearing clearance diminishes. Owing to this one-sided pressure rise, an immediate restoration to parallelism of the two bearing parts in relation to each other takes place and thereby a hydrodynamic stabilisation of the bearing. Due to this self-stabilising effect, no further machine elements are required for the purpose of centralising the bearing.

Since grooved bearings according to the invention centralise automatically, they can be started up from zero relative velocity when the sliding surfaces are made of sliding material with a high friction load capacity. For this purpose, the invention foresees hard materials, particularly those based on silicon carbides, including silicon carbides bonded with silicon nitride, as well as silicon nitrides, titanium carbides and tungsten carbides. Materials built up on a silicon carbide base but having a surplus of carbon have been found especially advantageous, particularly when the carbon is added in the form of carbon whiskers.

The grooves which produce the build-up of the pressure in the individual segments can be subdivided into groups. In this arrangement, one group in each segment builds up a hydrodynamic pressure in the direction towards the bearing axis and a further group of grooves in each segment builds up the pressure in the direction towards the periphery of the bearing, so that a maximum pressure is obtained at a radius of the sliding surface which is slightly larger than about half the radius of the loaded bearing annulus.

The position of the peak pressure point in the bearing clearance can be adjusted within limits by the overall effective length of the grooves conntected in series within each group in each segment.

The communicating channels which join the ends of the groove sections connected in series with the beginnings of the neighbouring grooves can be arranged on the side of the grooved bearing part opposite to the side facing the bearing clearance. In this arrangement, the channels communicate with the grooves through holes in the bearing part.

If the channels are arranged in a base component into which the grooved bearing part is fitted and the two components are made to turn relative to each other by a certain amount, the holes in the bearing part can be so geometrically correlated with the system of channels in the base component that in both end positions of the two relatively turning components the grooves in each segment are connected in series so that the pressure rises add up in both senses of bearing rotation. This measure yields a grooved bearing which adjusts itself automatically to the sense of rotation.

The grooves in the individual segments can run concentrically about the bearing axis or can be formed along straight lines. They can form acute or right angles to the radial planes. The pitch of the grooves in the individual segments can vary. The geometric arrangement of the grooves in the sliding surfaces is determined by considerations which govern the design of conventional spiral groove bearing.

DESCRIPTION OF THE DRAWINGS

The invention is explained by way of example with the help of figures.

FIG. 2b shows a partial cross-section along the section line IIb — IIb in FIG. 2a.

DESCRIPTION OF THE PREFERRED EMBODIMENTS

Figure 1A:
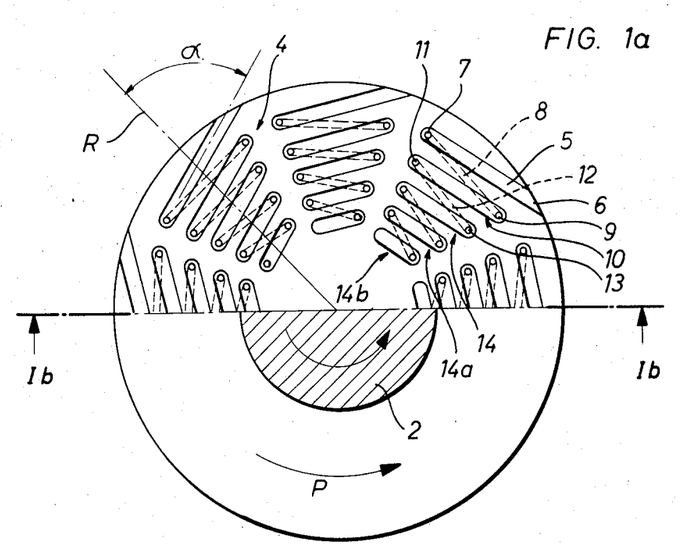
FIGS. 1a and 1b show in planview and in elevation (partly sectioned) a grooved bearing according to the invention with flat sliding surfaces.
Figure 1B:
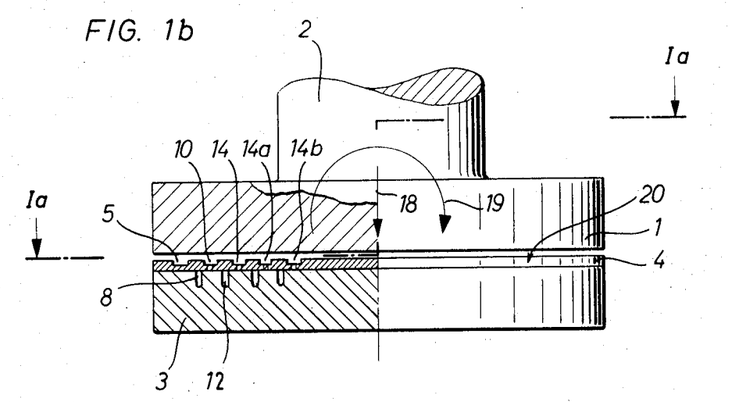

The FIGS. 1a and 1b show in planview and in elevation (partly sectioned) a hydrodynamic grooved bearing according to the invention. The rotating bearing part 1 is driven via a hub 2. The bearing element 4, covering the stationary bearing part, is subdivided into segments. A subdivision into 8 segments is illustrated.

In the illustrated embodiment, the grooves are straight and arranged obliquely, i.e., they form an acute angle $\alpha$ to a radial plane $R$ of the bearing. The grooves are in the bearing element 4 and are denoted by the reference numbers 5, 10, 14, 14a and 14b. The relative correlation and number of the grooves is the same in each segment. The groove nearest to the periphery 6 in each of the segments is open towards the periphery 6. At the other end of the groove nearest to the periphery there is a hole 7 which opens into a channel 8 (shown by broken lines) on the underside of the bearing element 4, which connects the hole 7 with the hole 9 at one end of the next groove 10. The other end of groove 10 is connected via the hole 11 with the channel 12, which, in turn, is connected via the hole 13 with the groove 14 so that, in each case, the front end, viewed in the direction of rotation, of one groove is connected, via a corresponding channel, with the rear end of the next groove, viewed in the direction towards the bearing axis and the partial pressures, built up in the individual grooves, add up. In this way, a pressre rising inwards from the periphery is built up. The pressure in each segment is determined by the magnitude of the bearing clearance between the rotating part 1 and the non-rotating part 3, 4. If, apart from the axial force 18, a moment 19 becomes effective, the force in the more highly loaded segment 20 becomes larger than that in the opposite segment and therefore exerts a restoring effect towards the initial position on the bearing.

Figure 2A:
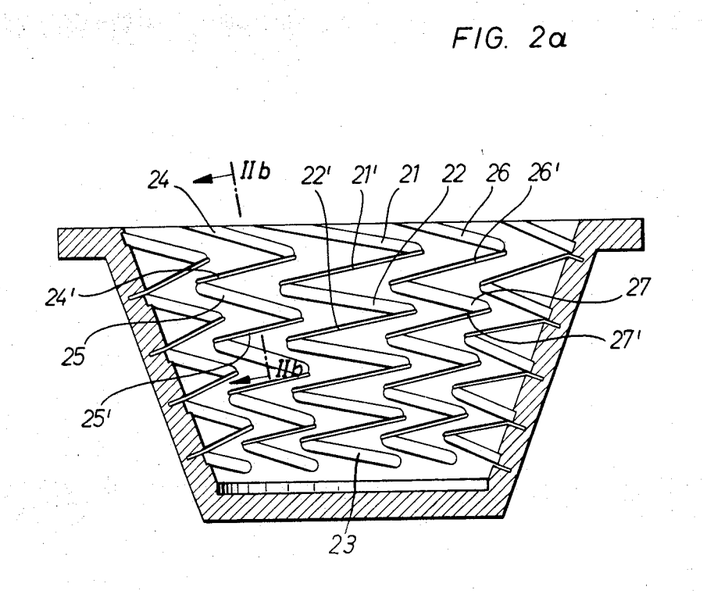
FIG. 2a shows diagrammatically an axial cross-section through the grooved bearing part of a grooved bearing according to the invention with conical sliding surfaces.
Figure 2B:
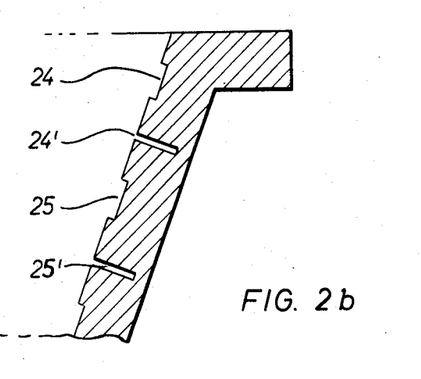

In FIGS. 2a and 2b, the grooved bearing part of a grooved bearing with conical sliding surfaces is illustrated in an axial cross-section. In this bearing, theg grooved sliding surface is subdivided into 8 segments. In this case, the segments overlap. The wide shallow grooves 21, 22, etc., 24, 25, etc., 26, 27, etc. which generate the hydrodynamic pressure, have a depth of, e.g., 0.001 to 0.01 mm. The ends of these pressure generating grooves are connected in series within each segment by narrow channels 21′, 22′ etc., 24′, 25′ etc., 26′, 27′, etc. in the illustrated manner, so that their partial pressures add up in the region of the corresponding segment. The narrow, deep channels, as can be seen in the cross-section drawing along the section line IIb — IIb, are narrow and relatively deep. Their depth is about 10 to 100 times larger than the depth of the wide grooves 21, 22, etc. so that, during the rotation of the bearing elements in relation to each other, no pressure is generated in these deep channels. The last of the pressure generating grooves 23 is preferably closed at the end. The grooves and the channels run approximately along opposing spiral lines so that the systems of neighbouring segments can overlap. In this way, a completely closed pressure build-up can be achieved in the carrying film.

Figure 3:
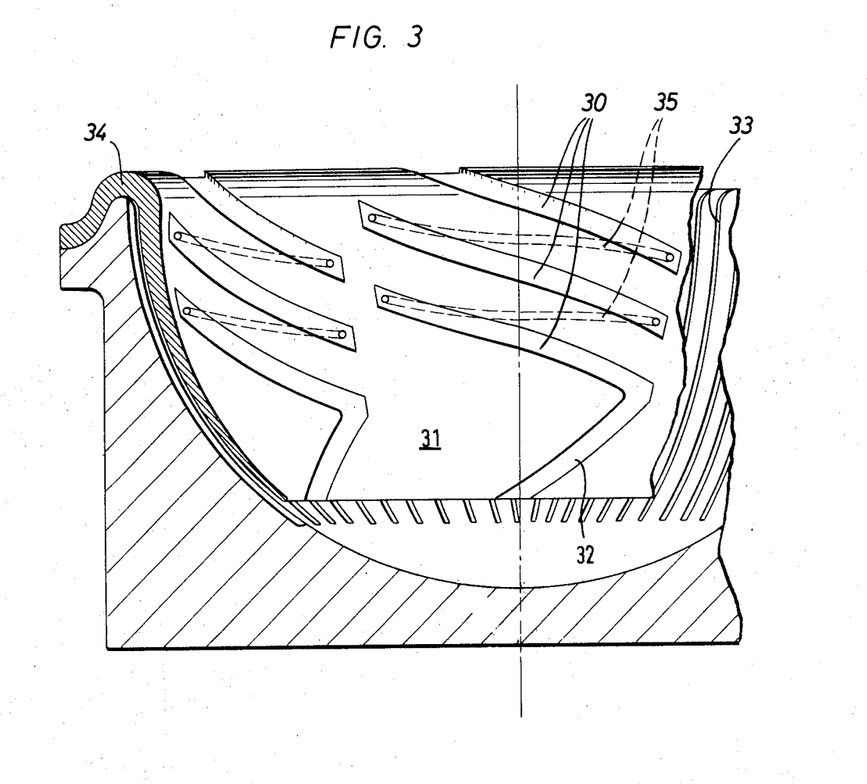
FIG. 3 shows diagrammatically a cross-section through the grooved bearing part of a grooved bearing with spherical sliding surfaces.

FIG. 3 shows a spherical bearing cup which operates in association with a hemisphere or a sphere. The grooves 30 do not run to the deepest point of the bearing cup 31 but, in the central portion they blend into the groove 32 pointing in the opposite sense. A small amount of the lubricant penetrates behind the bearing cup 31 through narrow slots 33 running along meridians and presses the cup against the spherical sliding counterpart. Through the bead 34, the cup 31 can be elastically pre-loaded and thereby pressed uniformly against the sliding counterpart. In this way, a situation is achieved by which the highest pressure in the bearing slot is not the same as the pressure which urges the bearing cup against the sliding counterpart. A beneficial adaptation of the compression pressure to the mean pressure in the bearing clearance is possible thereby.

Figure 4A:
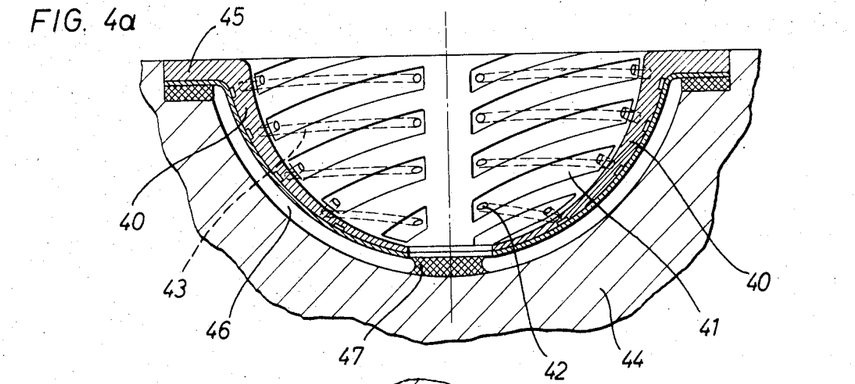
FIGS. 4a and 4b show a spherical bearing with an elastic wall.

FIG. 4a shows a similar bearing as FIG. 3, in which the bearing part 40 consists of two cups, soldered together. The grooves 41 are arranged in the interface and communicate with channels 43 via holes 42. The cup 40 is set into a casing 44 and is supported and centred by the flange 45. A star 47 made of an elastomeric material is placed in the cavity 46 between the cup 40 and the casing 44. The spokes of the star pass along the intermediate regions of the segments. Apertures 48 form at the centre in each case, through which the cavities enclosed in the segments 47a, 47b, etc., communicate with the lubrication clearance.

Figures 4B, 4C:
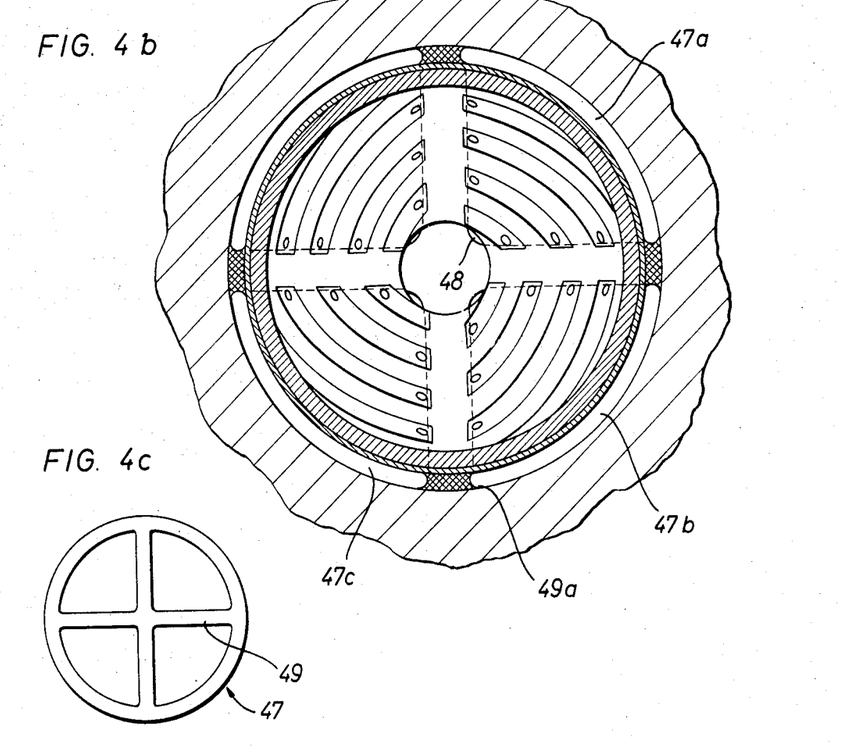
FIG. 4c shows a detail of the bearing according to FIGS. 4a and 4b.

FIG. 4c shows, on a smaller scale, the elastomeric star 47. As seen in the cross-section 4b, the spokes 49 of the elastomeric star are so formed that lips 49a ensure the sealing of neighbouring cavities 47b, 47c.

Figure 5A:
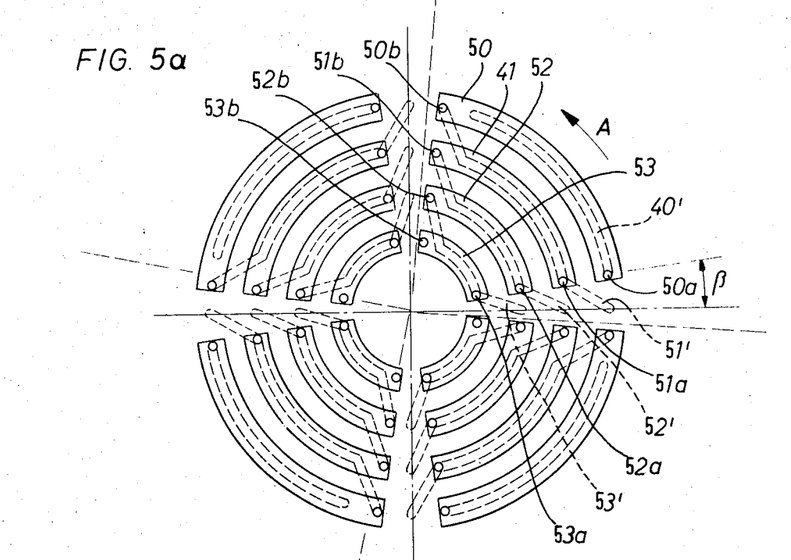
FIGS. 5a and 5b show diagrammatically the relative correlation of the grooves and the channels of a grooved bearing for an arbitrary sense of rotation about the bearing axis.
Figure 5B:
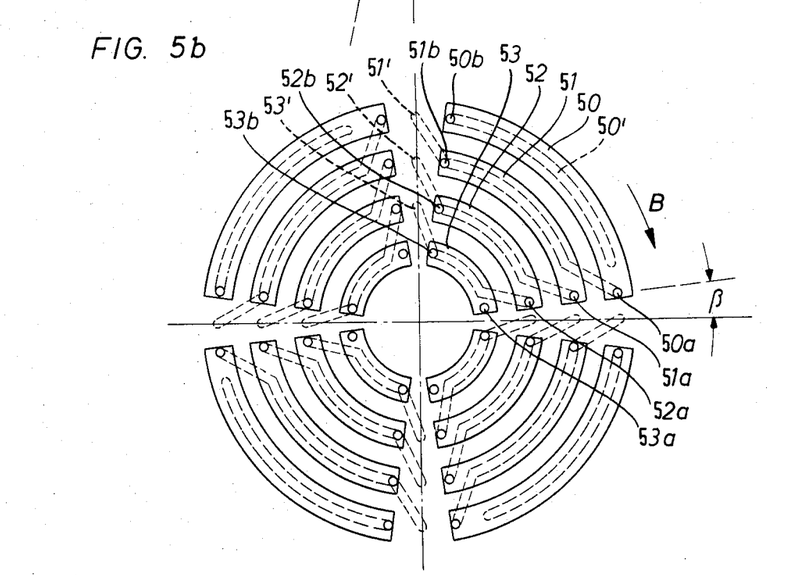

In FIGS. 5a and 5b, an arrangement of grooves is shown diagrammatically which are correlated with four segments in the bearing part. The grooves run concentrically about the bearing axis extending over an azimuth range of just under 90°. As in the embodiment according to FIGS. 1a and 1b, the grooves are in the surface of the bearing part facing the bearing clearance. These grooves in a single segment are denoted by the reference numbers 50, 51, 52 and 53 and are drawn in full lines. At the two ends of each groove, holes are provided which go through the bearing element. These holes are denoted by 50a to 53a and 50b to 53b.

The grooved bearing element is rotatably supported in a bearing base comprising the channels 50', 51', 52' and 53' The centring is ensured by a spigot (not shown). The turning range is limited by a stop pin and a recess (not shown). If the bearing part cooperating with the grooved bearing element rotates in the direction of the arrow A, the bearing element comprising the channels follows the rotation until its position is fixed by the stop-pin. At this point, the channels are covered in the manner described earlier and shown in FIG. 5a by the holes 50a to 53a and 50b to 53b. The extreme groove 50 in each case is connected via a channel (not shown) with the lubricant store. If the sense of rotation is changed, the grooved bearing element turns by an angle β determined by the recess in the direction of the arrow B. At this point, once again, the grooves 50 to 53, the correlated holes 50a to 53a and the channels 50' to 53' cover each other in such a way that the pressure building up at the end of the extreme groove 50 communicates with the beginning of the second groove 51, as shown in FIG. 5b.

With the arrangement shown in FIGS. 5a and 5b, a grooved bearing according to the invention can this be constructed in which on reversal of the sense of rotation of the bearing parts, the inward pressure build-up automatically readjusts itself.

We claim:

1. Plane bearings of the type having two bearing parts where the parts have surfaces of revolution facing each other forming the boundary of a bearing clearance adapted to contain a lubricant for carrying a load where one of the surfaces has grooves the width of which are larger than the depth and which are arranged such that during the rotation of the bearing parts relative to each other, a hydrodynamic pressure is generated by the lubricant in the bearing clearance which pressure increases towards the bearing axis, characterized in that the surface of revolution which is grooved is divided into at least two segments and having communicating channels connecting the beginning and ending of grooves in a segment such that hydrodynamic pressure rises in the individual grooves and increases in the direction towards the bearing axis.

2. Plain bearings according to claim 1, characterized in that the grooves beginning and ending in one segment are subdivided into two groups, where the grooves correlated to the group nearer the periphery of the surface of revolution are connected in series hydrodynamically via communicating channels such that the pressure rises in the individual grooves add up in the direction towards the bearing axis and the grooves correlated to the group nearer the bearing axis are connected in series hydrodynamically via communicating channels that the pressure rises in the individual grooves of this group add up in the direction towards the periphery of the surface of revolution.

3. Plain bearings according to claim 2, characterized in that the grooves in the individual segments are connected in series group by group such that the pressure rises in the individual grooves add up in the direction towards a circle with a radius of about one-half the radius of the effective sliding surface.

4. Plain bearings according to claim 1, characterized in that the grooves within the segments are parallel and run approximately concentrically about the bearing axis.

5. Plane bearings according to claim 1 characterized in that the grooves form acute angles in radial planes.

6. Plain bearings according to claim 4, characterized in that the grooves in the individual segments in at least two different groups form angles of different magnitude with the radial planes and that the extensions of the grooves of these two groups intersect.

7. Plain bearings according to claim 5, characterized in that the grooves form angles with the radial planes which continuously vary in the direction towards the bearing axis.

8. Plain bearings according to claim 1, characterized in that the communicating channels are formed on the side of the bearing part opposite to the side facing the bearing clearance.

9. Plain bearings according to claim 1, characterized in that the communicating channels are formed as channels open towards the bearing clearance, with a depth substantially larger than that of the pressure generating grooves.

10. Plain bearings according to claim 1, characterized in that the grooves of neighbouring segments partially overlap.

11. Plain bearings according to claim 1, characterized in that the end of the last groove in each segment nearest to the bearing axis is closed.

12. Plain bearings according to claim 1, characterized in that the bearing part comprising the grooves has a surface of revolution on the side opposite the side facing the bearing clearance and this opposite side is rotable on a bearing base, in which the communicating channels are placed, which communicate with the grooves via holes through the bearing part.

13. Plain bearings according to claim 12 for use in both senses of rotation, characterized in that the bearing part comprising the grooves and the bearing base comprising the channels can perform a definite limited turning motion relative to each other and that the communicating channels in the bearing base are so correlated with the holes through the bearing part in both end positions of the two parts that the grooves in the individual segments in the two different end positions are connected in series hydrodynamically in opposite senses.

14. Plain bearings according to claim 1, characterized in that one of the bearing parts is a thin-walled cup which is supported by a thick-walled bearing base.

15. Plain bearings according to claim 14, characterized in that the thin-walled bearing part has a bead at its periphery.

16. Plain bearings according to claim 15, characterized in that, between the thick-walled bearing base and the thin-walled bearing cup, channels are arranged which preferably lie along meridians.

17. Plain bearings according to claim 1, characterized in that, between the thin-walled bearing part and the thick-walled bearing base, a cavity remains which communicates with the bearing clearance via an aperture.

18. Plane bearings according to claim 17 characterized in that webs of an elastomeric material are positioned in the cavity to divide the cavity into segments.

19. Plain bearings according to claim 18, characterized in that each of the cavities communicates via an aperture with the correlated segment of the grooves.

20. Plain bearings according to claim 1, characterized in that the bearing part, which carries the grooves, consists of two permanently joined layers and that channels are formed between the two layers.

* * * * *

UNITED STATES PATENT OFFICE
CERTIFICATE OF CORRECTION

Patent No. 3,764,186     Dated October 9, 1973

Inventor(s) NIKOLAUS LAING, INGEBORG LAING and LUDWIG LUDIN

It is certified that error appears in the above-identified patent and that said Letters Patent are hereby corrected as shown below:

Col. 2, line 41 "self-centring" should be --self-centering--;
Col. 3, line 19 "conntected" should be --connected--;
Col. 4, line 34, "pressre" should be --pressure--;
Col. 4, line 45, "theg" should be --the--;
Col. 5, line 49, "centring" should be --centering--;
Col. 6, line 2, delete "this";
Claim 15, line 2, "part" should be --cup--;
Claim 17, line 1, "1" should be --14--;
Claim 17, line 2 "part" should be --cup--;

Signed and sealed this 12th day of March 1974.

(SEAL)
Attest:

EDWARD M. FLETCHER, JR.            C. MARSHALL DANN
Attesting Officer                  Commissioner of Patents